United States Patent [19]

Patel

[11] Patent Number: 4,595,736
[45] Date of Patent: Jun. 17, 1986

[54] THERMALLY STABLE DRILLING FLUID ADDITIVE COMPRISED OF A COPOLYMER OF CATECHOL-BASED MONOMER

[75] Inventor: Arvind D. Patel, Houston, Tex.

[73] Assignee: Dresser Industries, Inc., Dallas, Tex.

[21] Appl. No.: 687,438

[22] Filed: Dec. 28, 1984

Related U.S. Application Data

[62] Division of Ser. No. 501,900, Jun. 7, 1983, Pat. No. 4,525,562.

[51] Int. Cl.$^4$ .................... C08F 122/04; C08F 12/24; C09K 7/00
[52] U.S. Cl. .................................. 526/271; 526/288; 526/287; 526/307.5; 526/310; 526/313; 252/8.5 C
[58] Field of Search ............... 526/313, 287, 271, 310, 526/303.1, 288, 307.5

[56] References Cited

U.S. PATENT DOCUMENTS

| | | |
|---|---|---|
| 2,209,289 | 7/1940 | Wallace . |
| 2,354,672 | 8/1944 | Eastes et al. . |
| 2,459,835 | 1/1945 | Monroe . |
| 2,477,157 | 7/1949 | Wayne . |
| 2,552,775 | 5/1951 | Fischer et al. . |
| 2,582,265 | 1/1952 | Monroe . |
| 2,582,266 | 1/1952 | Monroe . |
| 2,704,277 | 3/1955 | Giammaria . |
| 2,801,981 | 8/1957 | Spacht . |
| 2,831,022 | 4/1958 | Blaricom et al. . |
| 2,911,365 | 11/1959 | Burland et al. . |
| 3,108,956 | 10/1963 | Dever et al. . |
| 3,230,201 | 1/1966 | Hart et al. . |
| 3,434,970 | 3/1969 | Siegele et al. . |
| 3,476,795 | 11/1969 | Allan . |
| 3,511,820 | 5/1970 | Verdol et al. . |
| 3,511,874 | 5/1970 | Allan . |
| 3,535,238 | 10/1970 | Kolaian . |
| 3,535,239 | 10/1970 | Kolaian . |
| 3,537,992 | 11/1970 | Kolaian . |
| 3,642,622 | 2/1972 | Kablaoui et al. . |
| 3,730,900 | 5/1973 | Perricone et al. . |
| 3,752,763 | 8/1973 | Kablaoui et al. . |
| 3,764,530 | 10/1973 | Burland et al. . |
| 3,768,565 | 10/1973 | Persinski et al. . |
| 3,856,845 | 12/1974 | Sears . |
| 3,879,298 | 4/1975 | Walker . |
| 3,879,299 | 4/1975 | Walker . |
| 3,907,927 | 9/1975 | Guilbault . |
| 3,932,488 | 1/1976 | Sears . |
| 3,953,342 | 4/1976 | Martin et al. . |
| 4,008,202 | 2/1977 | Evani et al. . |
| 4,238,579 | 12/1980 | Leonard, Jr. ........................ 526/310 |
| 4,357,245 | 11/1982 | Engelhardt et al. . |
| 4,379,068 | 4/1983 | Couderc ............................ 526/310 |
| 4,388,451 | 6/1983 | Culbertson et al. . |

FOREIGN PATENT DOCUMENTS

| | | |
|---|---|---|
| 2502012 | 7/1975 | Fed. Rep. of Germany . |
| 2444108 | 1/1976 | Fed. Rep. of Germany . |
| 2547773 | 4/1976 | Fed. Rep. of Germany . |
| 52-6791 | 1/1977 | Japan . |

OTHER PUBLICATIONS

Culbertson, B. M., et al, "Copolymerization of Allyl and Methallyl Substituted Phenols with Maleic Anhydride and Maleimides", *Polymer Preprints ACS Div. Polym. Chem.*, 23, 1 (1982).
Chesser, B. G., et al, "High Temperature Stabilization of Drilling Fluids with a Low-Molecular-Weight Copolymer", *Journal of Petroleum Technology*, 950-956 (Jun., 1980).
Russian publication, "Organic Viscosity Reducers in Clay Solutions", *Zhur. Priklad Khem.*, 35, 538-647 (1962) (In Russian).
Gray, G. R., et al, *Composition and Properties of Oil Well Drilling Fluids*, 4th Ed., pp. 547-576, Gulf Publishing Company, Houston, Texas (Aug., 1981).
Kutner, A., et al, "Sodium Ethylenesulfonate-N-Vinylprrolidine Copolymers", *Journal of Polymer Science*, 38, 274 (1959).
Falk, R. A., et al, "The Preparation and Properties of Surface-Active N-Acylamino-Methanesulfonates", *J. Am. Oil Chemist's Soc.*, 35, 171-176 (1958).
Suter, C. M., et al, "The Sulfomethylation Reaction", *Journal of Organic Chemistry*, 10, 470-478 (1945).
Breslow, D. S., et al, "Synthesis of Sodium Ethylenesulfonate From Ethanol", *J. Am. Chem. Soc.*, 76, 5361-5363 (1954).

*Primary Examiner*—Joseph L. Schofer
*Assistant Examiner*—Peter F. Kulkosky
*Attorney, Agent, or Firm*—Arnold, White & Durkee

[57] ABSTRACT

This invention relates to a water soluble polymer and method for its preparation. The water soluble polymer exhibits superior thermal stability characteristics when used as an additive in aqueous drilling fluids. The polymer consists of a major portion of a catechol based monomer and a dicarboxylic acid. Other monomers and materials are added to enhance the functional characteristics of the drilling fluid additive. The method of this invention includes the mixing of monomers, polymerization of that mixture and optionally the steps of hydrolysis and sulfonation.

9 Claims, No Drawings

THERMALLY STABLE DRILLING FLUID ADDITIVE COMPRISED OF A COPOLYMER OF CATECHOL-BASED MONOMER

This is a divisional of co-pending application Ser. No. 501,900 filed on June 7, 1983, and now U.S. Pat. No. 4,525,562.

FIELD OF THE INVENTION

This invention relates to a novel mixture of water soluble monomers for use after polymerization as additives in the formulation of aqueous drilling fluids. A general problem has been recognized in that commercially available additives to drilling fluids have demonstrated unsatisfactory thermal stability, especially at temperatures at which alkaline hydrolysis occurs. Alkaline hydrolysis is a common yet undesirable property of available drilling muds. The effect of alkaline hydrolysis or other forms of thermal instability is a severe decrease in the functional characteristics of the drilling fluid system.

In formulating a polymer for use as a drilling fluid additive it is necessary to consider the desired functional characteristics of the drilling fluid. Specifically, the viscosity, gel strength, filtrate loss and contamination control characteristics of the drilling fluid must be maintained within acceptable ranges.

Various water soluble polymers have been synthesized or otherwise developed, and certain polymers are known to occur naturally, some of which have shown at least a limited ability to control the viscosity, gel strength and filtrate loss of aqueous drilling fluids. However, the thermal stability of these materials is unacceptable, making their use in drilling activities of limited value. During the drilling of certain deep wells, i.e., in excess of fifteen thousand feet, or in geographic areas of high geothermal activity, the viscosity, gel strength and fluid loss of the drilling fluid are adversely affected as a function of temperature such that the noted functional characteristics are not within acceptable ranges.

The drilling fluid itself is an essential item in the oil-well drilling system. In particular, in rotary well drilling, the principal functions performed by the drilling fluid is to carry cuttings from beneath the drill bit, transport the cuttings from the annulus and permit their separation at the surface. The drilling fluid, or drilling mud as it is more typically called, also cools and cleans the drill bit, reduces friction between the drill string and sides of the drill hole and maintains the stability of uncased sections of the borehole.

It is essential that the drilling fluid formulation be such that it will prevent the inflow of fluids, such as oil, gas or water, from the permeable rock formations which have been penetrated or which are being penetrated.

The drilling fluid should also contain additives which permit the formation of a thin, low permeability filter cake which seals pores and other openings in the formations which are penetrated by the bit. Finally, the drilling mud must assist in the collection and interpretation of information available from drill cuttings, cores, and electrical logs.

There are certain limitations which are placed on the formulation of drilling muds for actual commercial use. The drilling fluids must be formulated such that they are not injurious to the drilling personnel and not damaging or offensive to the environment. The drilling fluids must not require unusual or expensive methods of completion of the drilled hole nor interfere with normal productivity of the fluid bearing formation. Finally it is essential that the drilling fluid not corrode or cause excessive wear to drilling equipment. From these requirements has arisen the need for specialized drilling additives which will assist the drilling mud formulation in the performance of these various functions.

The effectiveness of a drilling fluid and in particular the additives found in the drilling fluid are evaluated by measurement of certain characteristics of the drilling system. The viscosity, gel strength, filtrate loss, contamination control and tolerance to divalent ion characteristics of drilling fluids and drilling systems are all directly attributable to the drilling fluid or drilling mud. These properties, their definitions and a general explanation is found in a comprehensive treatise entitled *Composition and Properties of Oil Well Drilling Fluids,* 4th Ed. George R. Gray and H. C. H. Darley, Gulf Publishing Company, 1980.

The first essential characteristic of the drilling fluid which is useful with the additive of this invention is its viscosity. The viscosity of drilling fluids is very difficult to control because of the adverse conditions under which it is used as well as the excessively elevated temperatures to which it will be exposed. In this regard, during the drilling of certain deep wells, i.e., greater than 15,000 feet, it is common to be exposed to temperatures at which alkaline hydrolysis occurs. These temperatures can easily cause a severe change in the viscosity of the drilling fluid and thus adversely affect the flow characteristics of the drilling mud and adversely affect the overall drilling operation. Such viscosity modification at these temperatures is not acceptable in normal drilling fluids. Additionally, certain area of the country have excessive geothermal activity resulting in extremely high temperatures. The same effect can be had on drilling fluids at these geothermally elevated temperatures as in deep wells. In any event it is necessary that the viscosity of the drilling fluid be controlled within desired ranges, which are in many instances dependent on the geographic area of activity. The desired viscosity is a function of mud weight and yield point. As a general rule, as the mud weight increases, the viscosity increases, but the yield point is allowed to increase by a much smaller magnitude.

A second essential characteristic is the gel strength of the drilling fluid. Gel strength is a characteristic of the drilling fluid which reflects the ability of the drilling fluid to maintain a suspension of additives and drill cuttings, especially when circulation is stopped. As can be appreciated, if circulation of the drilling fluid is terminated, and if all of the suspended cuttings and additives to the drilling fluid were then permitted to settle at the lowest point an intolerable situation would be encountered and in all likelihood the drill string would be broken or the bit lost.

If the drilling fluid viscosity is too low, it is typically increased by adding bentonite. Ideally, the drilling fluid viscosity should be just high enough to suspend barite and drill cuttings when circulation is stopped. Higher drilling fluid viscosities are undesirable because they retard the separation of cuttings and of entrained gas at the surface, and also because they raise the pressure required to reestablish circulation after changing bits. Furthermore, when pulling pipe, a high gel strength may reduce the pressure of the mud column beneath the bed because of a swabbing action. If the reduction in pressure exceeds the differential pressure between the mud and the formation fluids, the fluids will enter the hole, and possibly cause a blowout. Similarly, when running pipe into the hole, the downward motion of the pipe causes a pressure surge which may, when conditions are critical, cause induced fracturing with consequent loss of circulation. Methods have been developed for this calculation of the magnitude of these pressure surges.

Related to the gel strength control is the ability of the drilling fluid to tolerate divalent ions. Typically, thinners are used to reduce the gel strength of fresh water of low salinity muds. The use of such thinners has an unfortunate secondary effect, i.e., the replacement of calcium or other polyvalent cations on clay cuttings by the sodium used to solubilize the thinner. This tends to disperse the clay into small particles, some of which are not removed at the surface, and are again recycled until they are reduced to colloidal size. This action makes the control of viscosity very difficult and expensive when drilling through colloidal clay formations with a fresh water mud (drilling fluid). The dispersive effect of the sodium ion may be offset by the addition of a calcium compound or else by the use of a polymer brine mud. The drilling fluid additive of this invention displays a high tolerance to divalent ions.

Another essential function of the drilling fluid is its ability to seal permeable formations exposed by the bit with a thin low permeability filter cake. In order for a filter cake to form it is essential that the drilling fluid contain particles of a size only slightly smaller than that of the pore openings of the formation. These particles are trapped in the surface pores while finer particles are carried deeper into the formation. The particles which are deposited on the formation are known as the filter cake.

It is essential to control the permeability of the filter cake. This permeability depends on the particle size distribution in the drilling fluid and on electrochemical conditions. In general, the more particles there are in the colloidal size range, the lower the cake permeability. The presence of soluble salts in clay muds increases the permeability of the filter cake sharply. Filtration performance in the well is routinely judged by means of the standard American Petroleum Institute filtration test. In this test, the mud is subjected to static filtration through filter paper for thirty minutes, and the volume of filtrate and the cake thickness are then measured. Within any specific drilling fluid and drilling system it is necessary to carefully control the filtrate loss within predesigned tolerance ranges. These tolerance ranges will vary from geographic area to geographic area depending on the type of formations encountered.

During drilling operations, it is always anticipated that the drilling fluid will be contaminated with various materials. Some of the potential contaminants are damaging to the ionic balance and viscosity properties of the drilling fluid. These impurities include sodium chloride, gypsum as well as other minerals and the like.

THE PRIOR ART

The method of synthesis and application of certain low viscosity water soluble copolymers used in drilling fluids is described by the prior art. Polymers derived from the copolymerization of maleic anhydride and N-vinyl ring compounds such as N-vinyl morpholine, N-vinyl pyrrolidone, and N-vinyl cyclic carbamate is disclosed in U.S. Pat. No. 3,108,956.

The synthesis of water soluble polymers containing sulfonic acid moities has been described in detail in many publications. For example, synthesis of the copolymers of vinyl sulfonic acid with acrylamide and vinyl pyrrolidone was published in *J. Poly Sci.* 38, 274 (1959). Extensive work has been done on copolymers containing 2-acrylamido-2-methyl propane sulfonic acid as a co-monomer. This work is described in U.S. Pat. Nos. 3,933,342, 3,768,565 and 3,907,927 and in Deutsche Offenlegungschrift's Nos. 2,502,013 and 2,547,773. Co-polymers from vinyl and/or alkyl sulfonates with acrylamide and vinyl amides are described in Deutsche Auslegungschrift's No. 2,444,108.

The use of substituted 1, 2-dihydroxybenzenes and 1, 2-dihydroxy aromatic heterocyclic compounds as disperants in aqueous drilling fluids is described in U.S. Pat. Nos. 3,535,238, 3,535,239, and 3,537,912. It is disclosed in *Zhur. Priklad Khem.* 35, pp. 638–47 (1962) "Organic Viscosity Reducers in Clay Solutions" that the orthodihydroxy benzenesulfonic acids and their alkali metal salts will reduce the viscosity of aqueous drilling fluids. The corresponding meta and para dihydroxy benzene derivatives are ineffective.

The copolymerization of allyl and methallyl substituted phenols with maleic anhydride and maleimide is described in *Polymer Preprints, ACS Div. Polym. Chem.*, 23(1), 1 (1982).

The method of synthesis and application to use in aqueous drilling fluids for colloid stabilization of a low molecular weight copolymer is disclosed in U.S. Pat. No. 3,730,900. The product is a copolymer of styrene sulfonic acid and maleic anhydride.

Sulfomethylation of the activated benzene ring and/or nitrogen atoms, as in amines and amides, can be carried out in aqueous solution using sodium bisulfite-formaldehyde adducts according to procedures described in *J. Am. Oil Chemists' Soci.*, 35, 171 (1958); and J. Org. Chem., 10,470 (1945). As a rule, 10 to 200 grams of sodium bisulfite-formaldehyde per 100 grams of copolymer are used. Preferred copolymers are obtained by reacting 50 to 100 grams of sodium bisulfite-formaldehyde adduct with 100 grams of copolymer in an aqueous solution at a pH of 8 to 12. The reaction is carried out at 40° to 80° C. for 2 to 16 hours.

Sulfoethylation of the copolymers is carried out by the addition of 3 to 30% sodium vinylsulfonate according to the Mannich reaction. Sulfoethylation is on the already hydrolyzed N-acylamines and unhydrolyzed amides as described in *J Am. Chem. Soc.* 76, 5361 (1954), *The Organic Chemistry of Sulfur,* New York, Wiley, New York (1944), and *Sulfonation and Related Reactions,* New York, Wiley, New York (1965).

The sulfomethylated copolymers having catechol type structures and prepared according to this invention are unusually effective additives for aqueous drilling fluids. These sulfomethylated copolymers provide colloidal stability, lower viscosity and gel strength, lower filtrate loss, and thinner filter cakes. The performance and effectiveness of these copolymers in aqueous drilling fluids which are subjected to elevated temperatures for extended periods of time are greatly superior to the next level of comparable aqueo fluid additives as described in U.S. Pat. No. 3,730,900 and in the *Journal of Petroleum Technology,* 950 (1980).

It has previously been known to use dispersants which consist of sulfonates and the copolymer of maleic anhydride and styrene sulfonic acid. As previously indicated these do not perform well at high temperatures because of alkaline hydrolysis.

Other patents which to the concept of this invention include: U.S. Pat. No. 2,704,277 (preparation of copolymers of maleic anhydride, allyl phenyl ether or allyl benzyl ether); U.S. Pat. No. 3,230,201 (formation of polymers and copolymers bearing sulfonic acid groups by reacting the appropriate polymer with compounds containing sulfonyl fluoride groups and hydrolyzing the product); and U.S. Pat. No. 3,511,820 (formation of solid polymers of 2-phenylallyl alcohol, and its esters with maleic anhydride).

Additional U.S patents which are relevant to the drilling fluid additive of this invention are: U.S. Pat. No. 3,642,622 (4-allyldihydroxybenzene as a drilling fluid dispersant); U.S. Pat. No. 3,752,763 (4-vinyldihydroxybenzene as a drilling fluid dispersant); U.S. Pat. No. 3,879,298 (rheology controlling mixture including an ethylenedicarboxylic acid); and U.S. Pat. No. 3,879,299 (rheology controlling mixture including a water soluble chromate and an ethylenedicarboxylic acid).

Examples of drilling fluid additives which are available commercially are sold under the trade names MILTEMP and SPERSENE. These materials are offered respectively by ARCO and Dresser Industries, Inc. MILTEMP is a sulfonated copolymer of polystyrene and maleic anhydride. The aromatic sulfonates are very susceptible to alkaline hydrolysis, to form a phenol. However, the aromatic alkyl sulfonates of this invention are not susceptible to such alkaline hydrolysis and hence demonstrate a superior thermal stability during actual use condition. SPERSENE is a chromium lignosulfonate. The lignosulfonates are susceptible to the same thermal stability problems as the aromatic sulfonates.

Therefore, it is an object of this invention to provide a water soluble polymer which will effectively control the viscosity, gel strength and fluid loss characteristics of an aqueous drilling fluid when exposed to downhole temperatures in excess of 300° F.

It is a further object of this invention to provide an additive which will effectively control the viscosity, gel strength, and fluid loss of an aqueous drilling fluid which becomes contaminated by sodium chloride contamination as frequently encountered during well drilling.

It is a still further object of this invention to provide a drilling fluid additive which will effectively control the viscosity, gel strength and fluid loss of aqueous drilling fluids which have had their densities increased by the addition of certain weighting materials such as barium sulfate.

These and other objects of this invention will become apparent from the detailed description of the preferred embodiment.

SUMMARY OF THE INVENTION

This invention relates to a water soluble polymer and method for its preparation. The water soluble polymer exhibits superior thermal stability characteristics when used as an additive in aqueous drilling fluids. The polymer consists of a major portion of a catechol based monomer and a dicarboxylic acid. Other monomers and materials are added to enhance the functional characteristics of the drilling fluid additive. The method of this invention includes the mixing of monomers, polymerization of that mixture and optionally the steps of hydrolysis and sulfonation.

DETAILED DESCRIPTION OF THE PREFERRED EMBODIMENTS

The polymers prepared according to this invention are effective additives for aqueous drilling fluids used during rotary drilling operations. The addition of the polymers prepared according to this invention to aqueous drilling fluids deflocculates the colloidal clay and drilled solids usually present in the fluid. This deflocculation permits relatively higher drilling fluid densities at lower viscosities and gel strengths. Another beneficial result is a reduction of the amount of drilling fluid filtrate loss to the formation with a corresponding reduction of the thickness of the filter cake deposited on the wall of the hole. When used as aqueous drilling fluid additives, polymers prepared according to this invention exhibit outstanding tolerance of divalent ions, specifically the calcium ion in the form of gypsum. These copolymers are stable at high temperatures and in the presence of dissolved ions. Furthermore, the sulfonated copolymers prepared according to the invention are highly effective additives for drilling fluids used for high alkalinity aqueous drilling operations and for drilling fluids containing soluble divalent ions.

In synthesizing the monomers which have utility in the product and process of this invention a catechol based monomer of the structure identified as Formula I is essential.

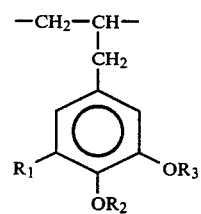

FORMULA I

In this catechol monomer $R_1$ represents hydrogen, hydroxyl or methoxy. $R_2$ and $R_3$ are equal or different and represent hydrogen, methyl or together become a methylene group. $R_3$ is sometimes also described as being part of a methylene group. Although the precise percentage of the Formula I catechol material that is present in the drilling fluid additive formulation will vary depending on the intended end use of the drilling fluid, the particular drilling formation and other factors, in the most preferred embodiment a major portion by weight of the drilling fluid additive will be the Formula I catechol material. In other embodiments of this invention up to 95% by weight of the formula is the Formula I catechol. In typical embodiments of this invention from 65% to 95% of the Formula I catechol is present and most preferably 70% to 95%. As additional monomers are added to the formulation percentages of each individual monomer will vary depending on the end use to which the product will be placed.

A second monomer which is optionally present in the polymer formulation of this invention is an unsaturated sulfonic acid having the general formula as illustrated by Formula II.

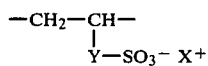 FORMULA II

In Formula II Y represents a direct combination or bridging element according to the formula:

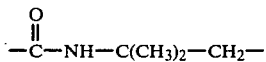

and X+ represents a cation. In the most preferred embodiment of this invention the unsaturated sulfonic acid of Formula II is present as a minor component by weight of the drilling fluid additive formulation. In less preferred embodiments of this invention the unsaturated sulfonic acid of Formula II is present in an amount up to 80% by weight of the drilling fluid additive formulation.

It is also essential to the drilling fluid composition that certain thinners be added. Thinners are added to drilling fluid to reduce flow resistance and gel development. Thinners are also added to reduce filtration and cake thickness, to counteract the effect of salts, to minimize the effects of water on the formations drilled, to emulsify oil and water, and to stabilize drilling fluid properties at elevated temperatures. The thinners which have shown utility in the product and process of this invention are the dicarboxylic acids. Most particularly, maleic anhydride, tetrahydrophthalic anhydride, itaconic acid or combinations thereof have shown exceptional utility in the product and process of this invention. The dicarboxylic acids must be present at a level of at least 5% by weight of the additive solution. However, in other embodiments the dicarboxylic acid is present in an amount of up to about 50% by weight, and most preferably is present at a level of approximately 30% by weight of the additive solution.

Thus, in the most preferred embodiment of this invention a catechol monomer of Formula I and a dicarboxylic acid are combined to form the ingredients for polymerization. While this formulation functions effectively as a drilling fluid additive other materials, which are discussed hereinbelow, are added to substantially enhance the functional characteristics of the drilling fluid additive of this invention. In another preferred embodiment of this invention a catechol monomer of Formula I, and unsaturated sulfonic acid of Formula II and a dicarboxylic acid are combined to form the ingredients for polymerization.

A monomer which is added to enhance the sulfonation characteristics, after hydrolysis, of the monomer mixture is described as N-vinyl acylamine of the structure described as Formula III. In Formula III R$_4$ is a hydrogen, a methyl or or part of a cyclic trimethylene group and R$_5$ is a hydrogen, a methyl or part of a cyclic trimethylene group. Stated differently, in Formula III R$_4$ and R$_5$ are equal or different and represent hydrogen, methyl or together may become a cyclic trimethylene group. The N-vinyl acylamine of Formula III is present at levels up to about 50% by weight of the drilling fluid additive.

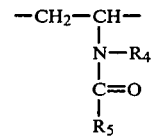 FORMULA III

Another material which can be added to enhance the functional characteristics of the fluid additive, especially after hydrolysis, is a substituted amide of the general configuration found in Formula IV.

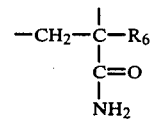 FORMULA IV

Formula IV R$_6$ is a hydrogen or a methyl group. Functionally, the substituted amide of Formula IV decreases substantially the fluid loss and acts as a thinner after hydrolysis. The substituted amide of Formula IV is typically present in amounts of up to 80% by weight of the drilling fluid additive formulation. In most preferred embodiments substantially less than 80% by weight will be present.

To enhance the functional characteristics of the drilling fluid additive formulation up to 25% by weight of a material selected from the group consisting of styrene, styrene sulfonic acid or combinations thereof is added.

Hydrolysis of the monomers of this invention especially by addition of sodium hydroxide to a pH of from about 8 to 12 converts the amide functions found in Formula III and Formula IV to amine functions and/or carboxyl functions as illustrated respectively by the vinyl substituted amine of formula V and the monocarboxylic acid illustrated by formula VI.

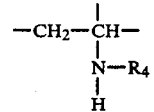 FORMULA V

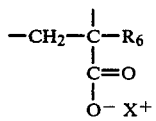 FORMULA VI

In the vinyl substituted amine obtained by hydrolysis of N-vinyl acylamine (Formula R$_4$ represents hydrogen, methyl or in combination with another molecule may become a trimethylene group with carboxyl function. In the monocarboxylic acid obtained by hydrolysis of the substituted amide, as illustrated by Formula VI, R$_6$ represents hydrogen or methyl while X+ represents a cation.

A variety of polymerization systems may be employed in practicing the present invention, such as solution polymerization, precipitation polymerization and emulsion polymerization. Solution polymerization is carried out either in water or in an organic solvent. The resulting copolymer is isolated by distilling off the solvent or by precipitation. Precipitation is accomplished by adding a miscible organic solvent in which the copolymer is insoluble. Examples of suitable solvents are acetone, methanol and other hydrocarbons. Solution polymerization is the preferred method of this invention.

The use of precipitation polymerization results in the preparation of the monomers of this invention in an organic solvent in which the monomers are soluble but the polymer is insoluble. In this precipitation polymerization process, the copolymer separates as a solid as polymerization occurs. The polymer can be isolated either by filtration or by distilling off the solvent. Final drying is accomplished by conventional means.

The third method for polymerization is emulsion polymerization. Preparation of the polymers of this invention in an emulsion involves emulsifying the aqueous solution of monomers in a water immiscible organic solvent such as cyclohexane, toluene or the like. Emulsification is accomplished by addition of 0.5% to 8%, preferably 1% to 4%, of a suitable water in oil type of emulsifier. An emulsion is a substantially permanent heterogeneous liquid mixture of two or more liquids which do not normally dissolve in each other but which are held in suspension, one in the other, by small amounts of additional substances known as "emulsifiers." These emulsifiers modify the surface tension of the droplets to keep them from coalescing. Surface active agents are good emulsifiers Typical among these are quarternary ammonium compounds, sulfonated oils, and polyhydric alcohol esters and ethers.

Polymerization is accomplished by addition of a suitable free radical initiator. This initiator may be either water soluble or oil soluble. Examples of free radical initiators used are azo compounds, benzoyl peroxide, azobisisobutyronitrile, azobis (2-amidinopropane) dihydrochloride. In addition, inorganic peroxy compounds such as amonium persulfonate, sodium persulfate or potassium persulfate are used. If necessary, the inorganic peroxy compounds can be used in combination with sodium or potassium metabissulfite. As a general rule, 0.1 to 15 grams of free radical initiator is used per 100 grams of total monomer.

An especially preferred step in the process of this invention is sulfonation. The preferred sulfonation techniques are sulfomethylation and sulfoethylation. Although the polymers of this invention are functionally effective in the absence of sulfonation, it has been found that this additional step greatly enhances the downhole characteristics of the drilling fluid additive of this invention.

Sulfomethylation of the activated benzene ring and/or nitrogen atoms as in amines and amides, can easily be carried out in aqueous solution using sodium bisulfite-formaldehyde adducts according to known prior art procedures (see the prior art section of this disclosure). As a rule, 10 to 200 grams of sodium bisulfite-formaldehyde per 100 grams of copolymer are used. Preferred copolymers are obtained by reacting to 50 to 100 grams of sodium bisulfite-formaldehyde adduct with 100 grams of copolymer in an aqueous solution at a pH of approximately 8 to 12. The reaction is typically carried out at 40° to 80° C. for two to sixteen hours.

Sulfoethylation of the copolymers is carried out by the addition of 3 to 30% of sodium vinyl sulfonate according to the Mannich reaction. Sulfoethylation occurs on the already hydrolyzed N-acylamine and unhydrolyzed amides as described in the prior art section of this disclosure. The sulfonated copolymers and polymers prepared according to this invention are highly effective additives for drilling fluids used for high alkalinity aqueous drilling operations.

It has been found that the sulfomethylated and sulfoethylated polymers of this invention having the catechol type structure of Formula I and prepared in accordance with the method and process of this invention are unusually effective additives for aqueous drilling fluids. These materials have a synergistic effect in providing colloidal stability, lower viscosity in gel strength, lower filtrate loss, and thinner filter cakes. The performance and effectiveness of these polymers in aqueous drilling fluids which are subjected to elevated temperatures for extended periods of time are greatly superior to the next level of comparable aqueous drilling fluid additives which are described in the patent literature and in publications. The superiority of the polymers of this invention in aqueous drilling fluids is described in the attached working examples.

EXAMPLES

The following examples establish that monomers having the catechol or ortho dihydroxy structure can be used to synthesize the polymer of this invention whereas the monomers having the phenol or monohydroxy structure cannot.

These copolymers were formed according to the precipitation polymerization method described herein:
1:
 61.5% Eugenol
 38.5% Maleic Anhydride
2:
 61.5% Safrole
 38.5% Maleic Anhydride
3:
 66.44% DMAP
 33.56% Maleic Anhydride
4:
 58:3% Allyl Phenol
 41.7% Maleic Anhydride A 12 pound per gallon fresh water mud was contaminated with 4 pound per barrel gypsum and treated with 3 pound per barrel copolymers. Treated muds were aged 16 hours at the temperatures indicated.

| COPOLYMER | AGING TEMP | 10 MINUTE GEL | API FLUID LOSS |
|---|---|---|---|
| Miltemp | 200° F. | 1 | |
| | 350° F. | 17 | |
| | 400° F. | 94 | 11.5 cc |
| | 425° F. | 221 | 14.0 cc |
| #1 | 300° F. | 5 | |
| | 350° F. | 8 | |
| | 400° F. | 63 | 9.4 cc |
| #2 | 200° F. | 5 | |
| | 300° F. | 6 | |
| | 400° F. | 4 | 5.0 cc |
| | 425° F. | 49 | 6.8 cc |
| #3 | 200° F. | 1 | |
| | 300° F. | 2 | |
| | 400° F. | 4 | 10.2 cc |
| | 425° F. | 22 | 10.6 cc |
| #4 | 300° F. | 23 | |
| | 350° F. | 25 | 13 |

These tables establish that polymers made with catechol type monomers of Formula I are effective gel strength and fluid loss control additives whereas polymers made with phenol type monomers are ineffective.

The following examples establish that copolymers which are formed using a catechol type monomer may have their efficiency further enhanced by sulfonation.

Example #1 consisting of the reaction product of 61.5% Eugenol and 38.5% maleic anhydride was subjected to 50% sulfomethylation.

Example #4 consisting of 58.3% allyl phenol and 41.7% maleic anhydride was subjected to 50% sulfomethylation.

| COPOLYMER | AGING TEMP | 10 MINUTE GEL | API FLUID LOSS |
|---|---|---|---|
| #1 | 300° F. | 5 | |
| | 350° F. | 8 | |
| | 400° F. | 63 | 9.4 cc |
| #1 50% Sulfomethylated | 300° F. | 1 | |
| | 350° F. | 3 | |
| | 400° F. | 21 | 8.1 cc |
| #4 | 300° F. | 23 | |
| | 350° F. | 25 | 13.0 cc |
| #4 50% Sulfomethylated | 300° F. | 22 | |
| | 350° F. | 239 | |

These examples establish that copolymers made from catechol type monomers are improved by sulfonation whereas copolymers made from phenolic type monomers are not improved by sulfonation.

The following examples establish that monomers having a characteristic amide group that can be hydrolyzed to an amine can be incorporated in the polymerization. These amine groups improve temperature stability of the polymers with respect to fluid loss control.

5:
30.77% Eugenol
46.15% Maleic Anhydride
23.07% N-vinyl-N-methyl acetamide

6.
30.77% Safrole
46.15% Maleic Anhydride
23.07% N-vinyl-N-methyl acetamide

| COPOLYMER | AGING TEMP | API FLUID LOSS |
|---|---|---|
| Miltemp | 400° F. | 11.5 cc |
| #5 | 400° F. | 8.0 cc |
| #6 | 400° F. | 8.0 cc |

What is claimed is:

1. A water soluble polymer having thermal stability and exhibiting utility as an aqueous drilling fluid additive comprising:
   (a) a major portion of a catechol based monomer having the formula:

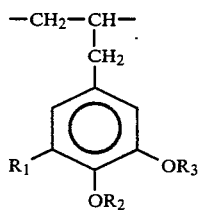

wherein $R_1$ is a hydrogen, hydroxyl or methoxy; wherein $R_2$ is a hydrogen, methyl or part of a methylene group and where $R_3$ is a hydrogen, methyl or part of a methylene group; and
   (b) a minor portion of a dicarboxylic acid monomer.

2. The water soluble polymer of claim 1 further comprising a minor portion of an unsaturated sulfonic acid of the formula:

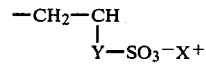

wherein Y represents a direct combination of a bridging element according to the formula:

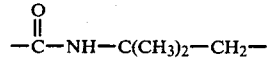

and $X^+$ represents a cation.

3. The water soluble polymer of claim 1 further comprising an N-vinyl acylamine having the formula:

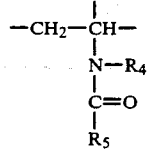

where $R_4$ is a hydrogen, a methyl or part of a cyclic trimethylene group and $R_5$ is a hydrogen, a methyl or part of a cyclic trimethylene group.

4. The water soluble polymer of claim 1 further comprising a substituted amide of the formula:

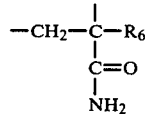

wherein $R_6$ is a hydrogen or a methyl group.

5. The water soluble polymer of claim 1 further comprising a material selected from the group consisting of: styrene, styrene sulfonic acid or combinations thereof.

6. The water soluble polymer of claim 2 wherein said dicarboxylic acid is selected from the group consisting of: maleic anhydride, tetrahydrophthalic anhydride, itaconic acid or combinations thereof.

7. The water soluble polymer of claim 1 wherein said catechol based monomer is sulfonated.

8. The water soluble polymer of claim 1 further comprising an alkyl substituted amine of the formula:

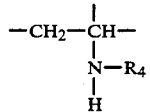

where $R_4$ is a hydrogen, a methyl or part of a cyclic trimethylene group.

9. The water soluble polymer of claim 1 further comprising a mono-carboxylic acid of the formula:

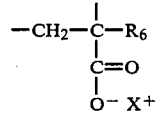

wherein $R_6$ represents a hydrogen or a methyl group and wherein $X^+$ represents a cation.

* * * * *